No. 670,822. Patented Mar. 26, 1901.
L. C. STURMAN.
FORK FOR HANDLING SHEAVES.
(Application filed Aug. 8, 1900.)
(No Model.) 2 Sheets—Sheet 1.
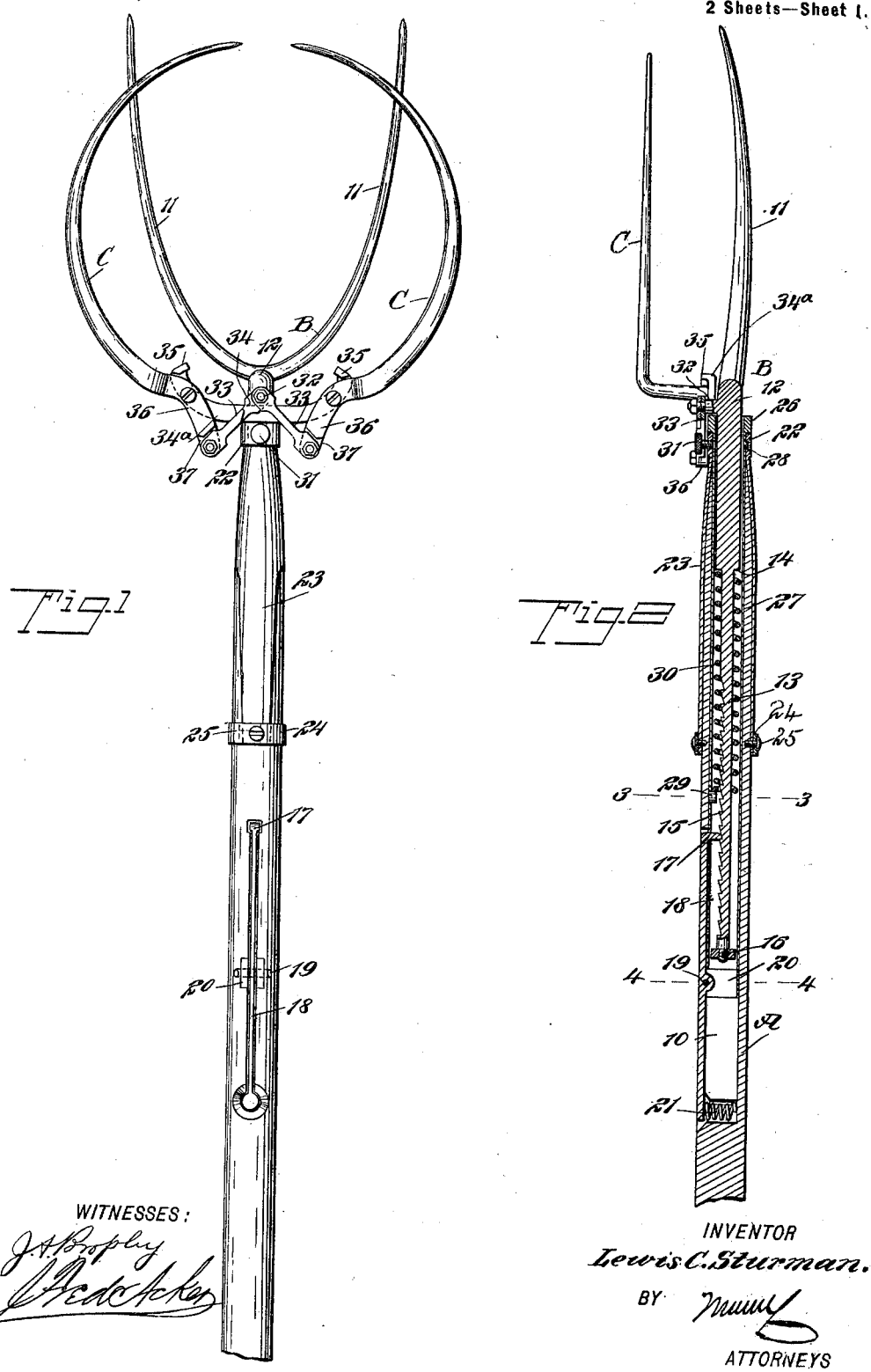
WITNESSES:
INVENTOR
Lewis C. Sturman.
BY
ATTORNEYS

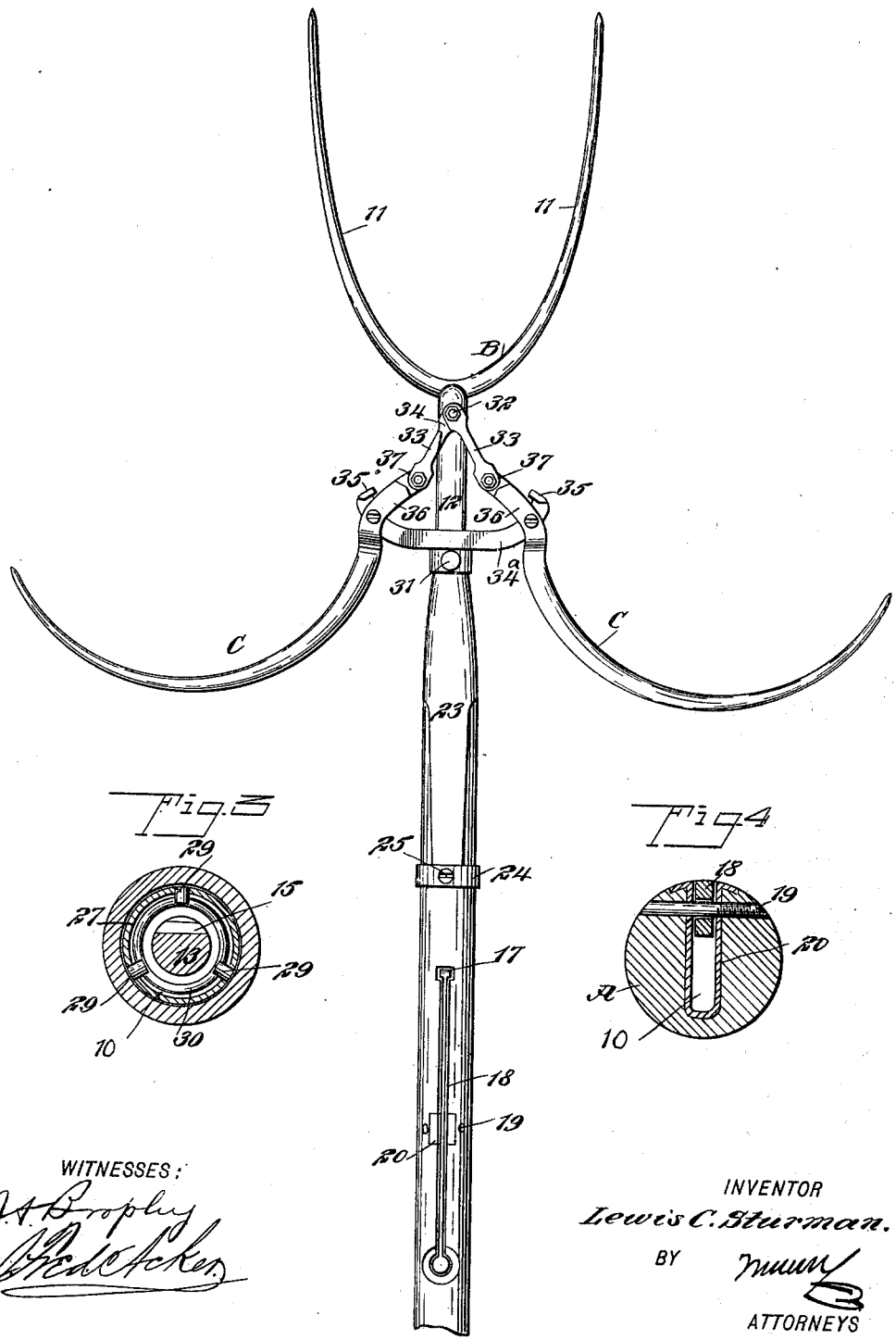

UNITED STATES PATENT OFFICE.

LEWIS CASS STURMAN, OF NINEMILE, MONTANA.

FORK FOR HANDLING SHEAVES.

SPECIFICATION forming part of Letters Patent No. 670,822, dated March 26, 1901.

Application filed August 8, 1900. Serial No. 26,269. (No model.)

*To all whom it may concern:*

Be it known that I, LEWIS CASS STURMAN, a citizen of the United States, and a resident of Ninemile, in the county of Missoula and State of Montana, have invented a new and Improved Fork for Handling Sheaves, of which the following is a full, clear, and exact description.

The purpose of the invention is to provide a fork especially adapted for handling sheaves, but which may be utilized as an ordinary pitchfork, and to so construct the improved device that in addition to the ordinary fork, which is movable or may be locked, clamping hooks or arms are employed, which as the main fork is forced into a sheaf will automatically close around the sheaf, means being provided for opening the arms at will.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a front elevation of the improved fork with the clamping-arms in a closed position extending over the tines or prongs of the main fork. Fig. 2 is a longitudinal vertical section taken through the central portion of the device. Fig. 3 is a transverse section on the line 3 3 of Fig. 2. Fig. 4 is a transverse section on the line 4 4 of Fig. 2; and Fig. 5 is a front elevation of the improved fork, showing the clamping-arms in open position.

A represents a handle which is provided with an inner chamber 10, extending from the outer end a certain distance in direction of the inner end, and B represents the main fork, consisting of two prongs or tines 11 of the ordinary form and a shank 12, which shank enters the chamber 10 of the handle and has longitudinal movement therein. The shank 12 is provided with a reduced inner end section 13, whereby a shoulder 14 is formed, and upon one face of the reduced section 13 of the shank a series of ratchet-teeth 15 are formed, and at the lower end of the reduced section 13 of said shank 12 of the main fork a nut 16 or an enlargement is formed which limits the movement of the shank in the handle, as when the shank 12 is carried out from the handle a sufficient distance the nut will strike against a head 17, forming a part of a latch-lever 18, which lever is located in a slot formed in the front face of the handle, as shown in Fig. 1, and is pivoted about centrally between its ends in the said handle by a pin 19, which pin is passed through a metal casing 20, which is embedded in the chamber 10 of the handle, as shown in Figs. 2 and 4. The lower end of the latch-lever 18 is pressed within the chamber 10 when the projection or head 17 is to be released from the ratchet-teeth 15, with which teeth the said head of the lever is adapted to normally engage, being held in such engagement by a spring 21, located within the handle and exerting outward pressure on the lower or free end of said latch-lever.

At the upper end of the handle a collar 22 is located, and a ferrule 23 is attached to this collar or is formed integral therewith, the ferrule extending along the outside of the handle A, as shown in Figs. 1, 2, and 5. The ferrule is usually held in position by a ring 24, passed around its inner end, and screws 25 or like devices, which extend through the ring and ferrule and into the handle, as shown in Fig. 2. A second collar 26 is located just beyond the collar 22. This second collar 26 is provided with an attached or integral tube 27, and this tube 27 extends down a certain distance into the chamber 10 of the handle, being in engagement with the wall of said chamber, as shown in Fig. 2, and the tube 27 and outer collar 26 are held in place by a screw 28, which is passed through the ferrule-collar 22, as is also shown in Fig. 2. Stops 29 are also provided to limit the outward movement of the shank of the main fork, and, as shown in Figs. 2 and 3, these stops consist of pins which extend through the handle and through the tube 27 into the chamber 10, as the head 17 of the latch-lever 18 may be frequently carried so far out from the chamber 10 that the enlargement 16 on the shank 12 is enabled to pass it. A spring 30 is coiled around the reduced portion 13 of the shank 12 of the main fork B, as illustrated in Fig. 2, and this spring has bearing against the shoulder 14 of the shank and rests against the stop-pins 29. When the shank of the main fork has been pressed or forced to its fullest extent into the chamber 10 of the handle, the spring 13 is placed under compression and the shank is held in such position by the engagement of the head 17 of the latch-lever with the ratchet-teeth 15 on the shank. When the shank of the main fork is released from engagement with the latch-lever 18, the spring 30 acts to carry the shank of the main fork out to its full outer position, (shown in Fig. 5,) and the shank may be locked or firmly held in this position through the medium of a set-screw 31, which is passed through the ferrule-collar 22 to an engagement with the upper portion of the said shank.

A stud 32 extends from the front portion of the outer end of the shank 12 of the main fork B, and on this stud two links 33 are pivoted one upon the other, and the lowermost link is provided at its pivot-point with a recess 34, which limits the movement of the links in direction of each other. These links extend across a cross-bar 34ᵃ, which is secured to or forms an integral portion of the front part of the outer collar 26, secured to the handle. The ends of the cross-bar are curved in an upward direction, and at each end of said cross-bar a forwardly-extending lip 35 is formed, which lips are at an angle to the body of the cross-bar. The shanks 36 of two clamping-arms C are pivotally attached to the upwardly-curved portions of the cross-bar 34ᵃ, at the front face of said bar, and these shanks at their inner ends are pivotally connected with the inner extremities of the links 33. The shanks 36 of the clamping-arms have recesses 37 where they connect with the links 33, so as to limit the movement of the clamping-arms C in direction of each other; but such movement is mainly limited by the lips 35. The clamping-arms C, which form a portion of the shanks 36, are carried to the front, where they connect with the shanks at more or less of an angle to said shanks, and these arms are curved in direction of each other in front of the main fork B. When the clamping-arms C are in their closed position, as shown in Fig. 1, they extend over the tines or members of the main fork B.

In the operation of the device, the main fork being in the position shown in Fig. 5—namely, the shank of the main fork extending some distance beyond the outer end of the handle A—the clamping-arms will be some distance inward from the main fork, one at each side of the said main fork, as shown in Fig. 5, and these clamping-arms may be held in this position by tightening the set-screw 31, at which time the main fork may be used simply as a pitchfork. When the fork is to be used for handling sheaves, the set-screw 31 is loosened, and as the main fork B is forced into a sheave the shank of the main fork will be forced to its full extent into the handle A. As the shank is thus forced into the handle the clamping-arms C will be carried in direction of each other by reason of the link connections described, and the said clamping-arms will extend around the sheave. The latch-lever 18 will now hold the parts in the position just described and as shown in Figs. 1 and 2. When the sheave is to be released from the fork, the free end of the latch-lever is pressed inward, thus releasing the shank of the main fork, and the spring 30 will then act and will force the shank of the main fork outward, carrying the clamping-arms to the rear position, (shown in Fig. 5,) whereupon the main fork may be drawn from the sheave in the ordinary manner.

Having thus described my invention, I claim as new and desire to secure by Letters Patent—

1. A device for handling sheaves, comprising a handle, a main fork the shank of which is movable in the handle, a locking device for the shank of the main fork, means for forcing the shank of the main fork from the handle to a certain extent when released from its locking device, and clamping-arms independent of the main fork and operated by the movement thereof, for the purpose set forth.

2. A device for handling sheaves, consisting of a handle, a main fork, a shank for the main fork having sliding movement in the handle and arranged to force the fork a certain distance out therefrom, ratchet-teeth formed upon the shank of the fork, a cross-bar attached to the handle, clamping-arms pivoted to the cross-bar and arranged in one position to cross the main fork, and links connected with the shank of the main fork and the rear ends of the clamping-arms, for the purpose set forth.

3. In a device for handling sheaves, a handle having a longitudinal bore, a main fork, a shank attached to the main fork, having sliding movement in the said handle, stops for the said shank located within the said bore, a spring coiled around the shank and acting normally to force the shank a certain distance out from the handle, ratchet-teeth formed on the shank, a latch-lever carried by the handle and arranged for engagement with the ratchet-teeth, arms curved in direction of each other, a support attached to the handle upon which the said arms are pivoted, links connecting the inner or rear ends of the said arms with the shank of the main fork, and means for locking the said shank of the main fork independent of the latch-lever, as described.

4. In a device for handling sheaves, the combination, with a handle having a bore therein extending from its outer end in direction of its inner end, a latch-lever located in said handle, the head of the latch-lever extending within said bore, a main fork, a shank for the said fork, which shank extends within the bore of the handle and has end movement therein, the said shank having a reduced lower end and ratchet-teeth produced upon one face of the said reduced portion of the shank, which ratchet-teeth are adapted to be engaged by the head of the latch-lever, stops arranged to limit the outward movement of the shank of the main fork, and a spring coiled around the shank, which spring is compressed when the shank is forced to its full extent in the bore of the handle, of a cross-bar attached to the handle at the front portion thereof, curved arms the shanks of which are pivoted to the said cross-bar, the arms being curved in direction of each other, while in one position the arms extend across the members of the main fork, links pivotally connected to the shank of the main fork near its outer end, said links being pivotally attached one to the shank of each of the said arms, and means for locking the shank against movement, as and for the purpose specified.

In testimony whereof I have signed my name to this specification in the presence of two subscribing witnesses.

LEWIS CASS STURMAN.

Witnesses:
    FRED. C. STODDARD,
    JOS. M. DIXON.